US012309398B2

(12) United States Patent
Blanch et al.

(10) Patent No.: US 12,309,398 B2
(45) Date of Patent: May 20, 2025

(54) CHROMA INTRA PREDICTION IN VIDEO CODING AND DECODING (71) Applicant: British Broadcasting Corporation, London (GB)

(72) Inventors: Marc Gorriz Blanch, London (GB); Marta Mrak, London (GB); Saverio Blasi, London (GB)

(73) Assignee: British Broadcasting Corporation, London (GB)

( * ) Notice: Subject to any disclaimer, the term of this patent is extended or adjusted under 35 U.S.C. 154(b) by 15 days.

(21) Appl. No.: 17/797,910

(22) PCT Filed: Nov. 19, 2020

(86) PCT No.: PCT/GB2020/052963
§ 371 (c)(1),
(2) Date: Aug. 5, 2022

(87) PCT Pub. No.: WO2021/156587
PCT Pub. Date: Aug. 12, 2021

(65) Prior Publication Data
US 2023/0062509 A1 Mar. 2, 2023

(30) Foreign Application Priority Data
Feb. 7, 2020 (GB) ..................... 2001722

(51) Int. Cl.
*H04N 19/186* (2014.01)
*G06N 3/02* (2006.01)
(Continued)

(52) U.S. Cl.
CPC ............. *H04N 19/186* (2014.11); *G06N 3/02* (2013.01); *G06N 3/08* (2013.01); *H04N 19/105* (2014.11);
(Continued)

(58) Field of Classification Search
CPC ........ H04N 19/186; H04N 19/44; G06N 3/02; G06N 3/08; G06N 3/0985
See application file for complete search history.

(56) References Cited

U.S. PATENT DOCUMENTS 7,515,084 B1    4/2009   Cruz-Albrecht et al.
9,609,343 B1    3/2017   Chen et al.
(Continued)

FOREIGN PATENT DOCUMENTS

CN    108322723 A    7/2018
CN    110602491      12/2019
(Continued)

OTHER PUBLICATIONS

Sharabayko et al., Effectiveness of Internal Block Prediction Methods, Proceedings of Tomsk Polytechnic University, 2013. T. 322. No. 5, with machine translation (14 pages).
(Continued)

*Primary Examiner* — David N Werner
(74) *Attorney, Agent, or Firm* — KLINTWORTH & ROZENBLAT IP LLP (57) ABSTRACT An intra-prediction mode is provided for chroma data, in which a neural network implemented attention module directs the encoding of a block of chroma data with respect to luma data for the collocated luma block.

16 Claims, 7 Drawing Sheets

(51) Int. Cl.
*G06N 3/08* (2023.01)
*H04N 19/105* (2014.01)
*H04N 19/132* (2014.01)
*H04N 19/176* (2014.01)
*H04N 19/44* (2014.01)
*G06N 3/0455* (2023.01)
*G06N 3/0464* (2023.01)
*G06N 3/0499* (2023.01)
*G06N 3/0985* (2023.01)

(52) U.S. Cl.
CPC ......... *H04N 19/132* (2014.11); *H04N 19/176* (2014.11); *H04N 19/44* (2014.11); *G06N 3/0455* (2023.01); *G06N 3/0464* (2023.01); *G06N 3/0499* (2023.01); *G06N 3/0985* (2023.01)

(56) References Cited

U.S. PATENT DOCUMENTS

| | | | |
|---|---|---|---|
| 10,904,522 | B2 | 1/2021 | Lim et al. |
| 2012/0008675 | A1 | 1/2012 | Karczewicz et al. |
| 2012/0314766 | A1 | 12/2012 | Chien et al. |
| 2013/0051467 | A1 | 2/2013 | Zhou et al. |
| 2013/0343648 | A1 | 12/2013 | Sato |
| 2017/0251213 | A1 | 8/2017 | Ye et al. |
| 2017/0280144 | A1 | 9/2017 | Dvir |
| 2018/0249156 | A1 | 8/2018 | Heo et al. |
| 2018/0302631 | A1 | 10/2018 | Chiang et al. |
| 2019/0342546 | A1* | 11/2019 | Lin ............ H04N 19/593 |
| 2019/0356915 | A1 | 11/2019 | Jang et al. |
| 2019/0373264 | A1 | 12/2019 | Chong et al. |
| 2020/0322620 | A1* | 10/2020 | Zhao ............ H04N 19/105 |
| 2020/0413049 | A1 | 12/2020 | Biatek et al. |
| 2021/0058636 | A1 | 2/2021 | Abe |
| 2022/0070475 | A1 | 3/2022 | Lee et al. |
| 2022/0109876 | A1 | 4/2022 | Zhang et al. |
| 2022/0174299 | A1 | 6/2022 | Zhang et al. |
| 2022/0279162 | A1 | 9/2022 | Ko et al. |
| 2022/0312012 | A1 | 9/2022 | Koo et al. |
| 2023/0300347 | A1* | 9/2023 | Kang ............ G06T 9/002 375/240.02 |

FOREIGN PATENT DOCUMENTS

| | | |
|---|---|---|
| DE | 102005052702 | 5/2007 |
| EP | 2717578 | 4/2014 |
| EP | 3217663 | 9/2017 |
| EP | 4009632 | 6/2022 |
| EP | 4017000 | 6/2022 |
| JP | 2015213367 | 11/2015 |
| JP | 6998888 | 1/2022 |
| KR | 2018/0082337 | 7/2018 |
| RU | 2584498 | 5/2013 |
| RU | 2014147451 | 6/2016 |
| WO | 2013039908 | 3/2013 |
| WO | 2016/074744 | 5/2016 |
| WO | 2017058615 | 4/2017 |
| WO | 2017189048 | 11/2017 |
| WO | 2018/128466 | 7/2018 |
| WO | 2018/132380 | 7/2018 |
| WO | 2018127188 | 7/2018 |
| WO | 2018132710 | 7/2018 |
| WO | 2018236031 | 12/2018 |
| WO | WO2019031410 A1 | 2/2019 |
| WO | 2019177429 | 9/2019 |
| WO | 2019201232 | 10/2019 |
| WO | 2020009357 | 1/2020 |
| WO | 2020014563 | 1/2020 |
| WO | 2018174402 | 6/2020 |
| WO | WO2021032045 A1 | 2/2021 |

OTHER PUBLICATIONS

Bezrukov and Balobanov, "Digital Broadcasting and Applied Television Systems," Moscow Hot Line—Telecom 2016 (p. 478, with machine translation (10 pages).

Bossen F et al, "Non-CE3: A unified luma intra mode list construction process", No. JVETM0528, Jan. 11, 2019 (Jan. 11, 2019), 13. JVET Meeting; Jan. 9, 2019-Jan. 18, 2019; Marrakech; (The Joint Video Exploration Team of ISO/IEC JTC1/SC29/WG11 and ITU-T SG.16) (4 pages).

Jie Yao et al, "Non-CE3: Intra prediction information coding", No. JVET-M0210, Jan. 11, 2019 (Jan. 11, 2019), 13. JVET Meeting; Jan. 9, 2019-Jan. 18, 2019; Marrakech; (The Joint Video Exploration Team of ISO/IEC JTC1/SC29/WG11 and ITU-T SG.16) (8 pages).

Blasi S et al, "CE3-related: Simplified unified luma intra mode coding", No. JVET-N0303, Mar. 12, 2019 (Mar. 12, 2019), 14. JVET Meeting; Mar. 19, 2019-Mar. 27, 2019; Geneva; (The Joint Video Exploration Team of ISO/IEC JTC1/SC29/WG11 and ITU-T SG.16) (6 pages).

Ru-Ling Liao, Chong Soon Lim, CE10.3.1.b: Triangular Prediction Unit Mode, JVET, Document JVET-L0124-v2, 12th Meeting, Macao, CN, Oct. 3-12, 2018 (8 pages).

M. Blaser, J. Sauer, and M. R. Wien, Description of SDR and 360° Video Coding Technology Proposal by RWTH Aachen University, JVET, Document JVET-J0023, 10th Meeting, San Diego, US, Apr. 10-20, 2018 (102 pages).

Y. Ahn, H. Ryu, D. Sim, Diagonal Motion Partitions on Top of QTBT Block Structure, JVET, Document JVET-H0087, 8th Meeting, Macao, CN, Oct. 18-25, 2017 (6 pages).

M. Blaser, J. Sauer, and M. R. Wien, CE10: Results on Geometric Block Partitioning (Test 3.3), JVET, Document JVET-K0146, 11th Meeting, Ljubljana, SI, Jul. 10-18, 2018 (2 pages).

J. Chen et al, Algorithm Description for Versatile Video Coding and Test Model 3 (VTM 3), JVET, Document JVET-L1002, 12th Meeting, Macao, CN, Oct. 3-12, 2018 (48 Pages).

B. Bross et al, Versatile Video Coding (Draft 3); JVET, Document JVET-L1001-v9, 12th Meeting, Macao, CN, Oct. 3-12, 2018, (238 pages).

Chen et al, Algorithm Description of Joint Exploration Test Model 4, JVET, Document JVET-D1001_v3, 4th Meeting, Chengdu, CN, Oct. 15-21, 2016 (40 pages).

Abe et al, CE6: AMT and NSST complexity reduction (CE6-3.3), JVET, Document JVET-K0127-v2, 11th Meeting, Ljubljana, SI, Jul. 10-18, 2018 (6 pages).

Bross et al, Versatile Video Coding (Draft 5), JVET, Document JVET-N1001-v8, 14th Meeting, Geneva, CH, Mar. 19-27, 2019 (400 pages).

J. Silva-Martinez: "Wideband Continuous-Time Multi-Bit Delta-Sigma ADCs", Mar. 31, 2021 (Mar. 31, 2012), XP055624271, Retrieved from the Internet: URL:https://pdfs.semanticscholar.org/eb2c/d8144eca2ac3c8fb24c025ee667ffa80499b.pdf [retrieved on Sep. 19, 2019] pp. 14,20,41-p. 45 (60 pages).

M. Chiang, C. Hsu, Y. Huang, S. Lei, CE10.1: Combined and Multi-Hypothesis Prediction, Document JVET-K0257-v1, 11th JVET Meeting, Ljubljana, SI, Jul. 2018 (6 pages).

W. Xu, H. Yang, Y Zhao, J. Chen, CE10-related: Inter Prediction Sample Filtering, Document JVET-L0375-v1, 12th JVET Meeting, Macao, CN, Oct. 2018 (4 pages).

J. Chen, Y. Ye, and S. H. Kim, "Algorithm description for Versatile Video Coding and Test Model 2 (VTM 2)," Tech. Rep., document JVET-K1002, 11th JVET Meeting, Ljubljana, SI, Jul. 2018 (21 pages).

G. J. Sullivan, J. Ohm, W. Han, and T. Wiegand, "Overview of the High Efficiency Video Coding (HEVC) Standard," IEEE Transactions on Circuits and Systems for Video Technology, vol. 22, No. 12, pp. 1649-1668, Dec. 2012 (20 pages).

T. Laude and J. Ostermann, "Deep Learning-Based Intra Prediction Mode Decision for HEVC," in 2016 Picture Coding Symposium (PCS), Dec. 2016 (6 pages).

T. Wang, M. Chen, and H. Chao, "A Novel Deep Learning-Based Method of Improving Coding Efficiency from the Decoder-end for HEVC," in 2017 Data Compression Conference (DCC), Apr. 2017, pp. 410-419 (11 pages).

(56) References Cited

OTHER PUBLICATIONS

J. Pfaff, P. Helle, D. Maniry, S. Kaltenstadler, B. Stallenberger, P. Merkle, M. Siekmann, H. Schwarz, D. Marpe, and T. Wiegand, "Intra Prediction Modes Based on Neural Networks," Tech. Rep., document JVET-J0037, 10th Meeting, San Diego, US, Apr. 2018 (19 pages).

Y. Wang, X. Fan, C. Jia, D. Zhao, and W. Gao, "Neural Network Based Inter Prediction for HEVC," in 2018 IEEE International Conference on Multimedia and Expo (ICME), Jul. 2018 (6 pages).

M. Afonso, F. Zhang, and D. R. Bull, "Video Compression Based on Spatio-Temporal Resolution Adaptation," IEEE Transactions on Circuits and Systems for Video Technology, vol. 29, No. 1, pp. 275-280, Jan. 2019 (7 pages).

T. Li, M. Xu, and X. Deng, "A Deep Convolutional Neural Network Approach for Complexity Reduction on Intra-Mode HEVC," in 2017 IEEE International Conference on Multimedia and Expo (ICME), Jul. 2017, pp. 1255-1260 (7 pages).

N. Westland, A. S. Dias, and M. Mrak, "Decision Trees for Complexity Reduction in Video Compression," in 2019 IEEE International Conference on Image Processing (ICIP), Sep. 2019 (5 pages).

M. Naccari, A. Gabriellini, M. Mrak, S. Blasi, I. Zupancic, and E. Izquierdo, "HEVC Coding Optimisation for Ultra High Definition Television Services," in 2015 Picture Coding Symposium (PCS), May 2015, pp. 20-24 (5 pages).

J. Kim, S. Blasi, A. S. Dias, M. Mrak, and E. Izquierdo, "Fast Inter-Prediction Based on Decision Trees for AV1 Encoding," in 2019 IEEE International Conference on Acoustics, Speech and Signal Processing (ICASSP), May 2019, pp. 1627-1631 (5 pages).

B. Xu, X. Pan, Y. Zhou, Y. Li, D. Yang, and Z. Chen, "CNN-Based Rate-Distortion Modeling for H.265/HEVC," in 2017 IEEE Visual Communications and Image Processing (VCIP), Dec. 2017 (4 pages).

M. Santamaria, E. Izquierdo, S. Blasi, and M. Mrak, "Estimation of Rate Control Parameter s for Video Coding Using CNN," in 2018 IEEE Visual Communications and Image Processing (VCIP), Dec. 2018 (4 pages).

G. Luz, J. Ascenso, C. Brites, and F. Pereira, "Saliency-driven Omnidirectional Imaging Adaptive Coding: Modeling and Assessment," in 2017 IEEE 19th International Workshop on Multimedia Signal Processing (MMSP), Oct. 2017 (6 pages).

W. Cui, T. Zhang, S. Zhang, F. Jiang, W. Zuo, Z. Wan, and D. Zhao, "Convolutional Neural Networks Based Intra Prediction for HEVC," in 2017 Data Compression Conference (DCC), Apr. 2017 (11 pages).

R. Yang, M. Xu, T. Liu, Z. Wang, and Z. Guan, "Enhancing Quality for HEVC Compressed Videos," IEEE Transactions on Circuits and Systems for Video Technology, Sep. 2017 (15 pages).

Y. Zhang, T. Shen, X. Ji, Y. Zhang, R. Xiong, and Q. Dai, "Residual Highway Convolutional Neural Networks for In-loop Filtering in HEVC," IEEE Transactions on Image Processing, vol. 27, No. 8, pp. 3827-3841, Aug. 2018 (15 pages).

R. Song, D. Liu, H. Li, and F. Wu, "Neural Network-Based Arithmetic Coding of Intra Prediction Modes in HEVC," in 2017 IEEE Visual Communications and Image Processing (VCIP), Dec. 2017 (4 pages).

Y. Li, D. Liu, H. Li, L. Li, F. Wu, H. Zhang, and H. Yang, "Convolutional Neural Network-Based Block Up-Sampling for Intra Frame Coding," IEEE Transactions on Circuits and Systems for Video Technology, vol. 28, No. 9, Feb. 2017 (15 pages).

J. Li, B. Li, J. Xu, and R. Xiong, "Intra Prediction Using Fully Connected Network for Video Coding," in 2017 IEEE International Conference on Image Processing (ICIP), Sep. 2017 (5 pages).

M. Meyer, J. Wiesner, J. Schneider, and C. Rohlfing, "Convolutional Neural Networks for Video Intra Prediction Using Cross-Component Adaptation," in 2019 IEEE International Conference on Acoustics, Speech and Signal Processing (ICASSP), May 2019, pp. 1607-1611(5 pages).

P. Helle, J. Pfaff, M. Schafer, R. Rischke, H. Schwarz, D. Marpe, and T. Wiegand, "Intra Picture Prediction for Video Coding with Neural Networks," in 2019 Data Compression Conference (DCC), Mar. 2019, pp. 448-457 (10 pages).

D.-A. Clevert, T. Unterthiner, and S. Hochreiter, "Fast and Accurate Deep Network Learning by Exponential Linear Units (ELUs)," in Proceedings of the International Conference on Learning Representations (ICLR), May 2016 (14 pages).

E. Agustsson and R. Timofte, "NTIRE 2017 Challenge on Single Image Super-Resolution: Dataset and Study," in 2017 IEEE Conference on Computer Vision and Pattern Recognition Workshops (CVPRW), Jul. 2017 (10 pages).

J. Boyce, K. Suehring, X. Li, and V. Seregin, "JVET common test conditions and software reference configurations," Tech. Rep., document JVET-J1010, 10th Meeting, San Diego, US, Apr. 2018 (6 pages).

Dhruti Patel et al, "Review on Intra-prediction in High Efficiency Video Coding (HEVC) Standard", International Journal of Computer Applications, vol. 132, No. 13, pp. 27-30, Dec. 2015 (4 pages).

J. Chen et al., "Algorithm Description for Versatile Video Coding and Test Model 5 (VTM 5)," JVET Meeting, Document JVET-N1002, Jun. 2019 (76 pages).

A. K. Ramasubramonian et al., "Non-CE3: On Signalling of MIP Parameters," JVET Meeting, Document JVET-O0755, Jun. 2019 (6 pages).

Z. Wang, A. C. Bovik, H. R. Sheikh, and E. P. Simoncelli, "Image Quality Assessment: From Error Visibility to Structural Similarity," IEEE Transactions on Image Processing, vol. 13, No. 4, Apr. 2004 (14 pages).

Examination Report issued in connection with Eurasian Patent Appl. No. EA202292258, dated Mar. 24, 2023, and English translation thereof (20 pages).

Examnation Report issued in connection with Patent Appl. No. GB2001722.4, dated Feb. 13, 2023 (4 pages).

International Search Report of the International Searching Authority issued in connection with International Application No. PCT/GB2020/052963, Mar. 26, 2021 (4 pages).

Written Opinion of the International Searching Authority issued in connection with International Application No. PCT/GB2020/052963, Mar. 26, 2021 (5 pages).

Y. Li, et al., "A Hybrid Neural Network for Chroma Intra Prediction", 2018 25th IEEE International Conference on Image Processing (ICIP), IEEE, Oct. 7, 2018, pp. 1797-1801 (6 pages).

International Preliminary Report on Patentability of the International Bureau issued in connection with International Patent Application No. PCT/GB2020/052963, Aug. 18, 2022 (7 pages).

Combined Search and Examination Report issued in connection with United Kingdom Patent Application No. GB2001722.4, Aug. 6, 2020 (7 pages).

J. Pfaff et al., "CE3: Affine Linear Weighted Intra Prediction (CE3-41, CE3-4.2)," JVET Meeting, Document JVET-N0217, Mar. 2019 (18 pages).

Chinese Office Action issued in connection with CN Patent Application No. 202080099291.8 and machine translation thereof, dated Dec. 11, 2024, 19 pages.

* cited by examiner

CHROMA INTRA PREDICTION IN VIDEO CODING AND DECODING

FIELD

The present disclosure relates to video coding and decoding.

BACKGROUND

Digital video can be encoded for transport and/or storage. This can have efficiency advantage, in terms of demand for channel bandwidth, storage requirements, and error detection and/or correction.

Video compression techniques involve taking blocks of video data, and employing a variety of approaches to take advantage of redundancy. For example, intra-prediction is a spatial approach, which involves encoding a video block with reference to another (predictive) video block in the same frame of video data. On the other hand, inter-prediction is a temporal approach, involving encoding a video block of a video frame with reference to a corresponding (predictive) block of another frame of the video data.

Typically, video data comprises luminance (luma) data and chrominance (chroma) data. The luma data represents the brightness of an image, without reference to colour. In essence, the luma data describes a black-and-white image and, in fact, such an image can be reconstructed from luma data alone. Chroma data represents colour information which can be used to reconstruct colour on the black- and white image.

Luma and chroma data may be coded using different approaches. The human eye is far more sensitive to luma than to chroma; this gives rise to an opportunity to compress chroma data further than luma data.

DESCRIPTION OF EMBODIMENTS

Versatile Video Coding (VVC) (MPEG-I Part 3) is a video compression standard currently being developed by the Joint Video Experts Team (JVET), a united video expert team of the MPEG working group of ISO/IEC JTC 1 and the VCEG working group of ITU-T.

Intra-prediction is typically employed in order to exploit spatial redundancies within a frame, by computing predictions based on already reconstructed samples in the close surroundings of the current block. The latest VVC draft (referred to simply as VVC in the rest of this document) allows a large number of possible intra-prediction modes ("Intra modes") to be used to predict the luma component, including up to 65 angular (directional) modes, Planar and DC prediction, and other advanced prediction methods.

This large number of options comes at the cost of a considerable amount of signalling data, to signal which of the intra modes has been employed on a block of luma data. Conversely, to limit the impact of intra-mode signalling, a reduced number of intra modes is employed to intra-predict the chroma components. This includes a sub-set of the modes available to predict the luma, including for instance the Derived Mode (DM, corresponding to using the mode used to predict the luma) plus a small set of fixed candidates including Planar, DC, pure horizontal and pure vertical modes.

In addition, VVC specifies usage of Cross-Component Linear Model (CCLM) intra modes. When using CCLM, the chroma component is predicted from the already-reconstructed luma samples using a linear model. The parameters of the model are derived by means of a simple linear regression, applied to the reconstructed neighbouring luma and chroma samples extracted from the coding block top-left boundaries. Three CCLM modes are currently employed in VVC, including a general LM mode using the top-left available samples, and two directional LM modes employing extended arrays of reference samples extracted exclusively from the top or from the left of the current block, respectively.

Usage of LM prediction has been established to be effective in improving the efficiency of chroma intra-prediction. However, embodiments disclosed herein seek to obtain further advantage from other approaches.

It is observed here that the usage of simple linear predictions can be limiting. Embodiments disclosed herein may achieve improved performance, with respect to existing techniques, by using more sophisticated architectures based on Machine Learning (ML) mechanisms.

A hybrid neural network for chroma intra prediction is described in "A hybrid neural network for chroma intra prediction." (Li, Yue, Li Li, Zhu Li, Jianchao Yang, Ning Xu, Dong Liu, and Houqiang Li.; 2018 *25th IEEE International Conference on Image Processing (ICIP)*, pp. 1797-1801. IEEE, 2018)], in which a convolutional neural network (CNN), for extracting features from reconstructed luma samples of the current block, was combined with existing fully-connected-based architectures for extracting cross-component correlations between neighbouring luma and chroma samples. Using such an architecture, it is possible to derive complex non-linear mappings for end-to-end predicting the Cb and Cr channels. However, such an architecture typically disregards the spatial correlation of boundary samples in predicting the corresponding locations in the predicted block.

Embodiments disclosed herein provide a neural network architecture which incorporates an attention module for controlling the contribution of each reference neighbouring sample when computing the prediction for each sample location, ensuring that spatial information is considered when computing the prediction. Similarly to the aforementioned hybrid neural network, a method according to an embodiment disclosed herein adopts a scheme based on three network branches that are combined to produce prediction samples. The first two branches work concurrently to extract features from the available reconstructed samples, including the already reconstructed luma block as well as the neighbouring luma and chroma reference samples. The first branch (referred to as cross-component boundary branch) aims at extracting cross-component information from neighbouring reconstructed samples, using an extended reference array on the left of and above the current block. The second branch (referred to as luma convolutional branch) extracts spatial patterns over the collocated reconstructed luma block applying convolutional operations. Embodiments described herein present a process of fusing the features output by the first and second branches, using the attention module. Examples of an attention module will be described below. The output of the attention module is finally fed into a third network branch, to produce the resulting Cb and Cr chroma output predictions.

This approach, using neural networks to implement chroma prediction, can be viewed as an augmentation of the existing chroma prediction modes defined in VVC. Thus, in an embodiment, the neural network based architecture can be implemented to compete with the established modes for the supported 4×4, 8×8, 16×16 settings. Then, for each prediction unit, the encoder will choose between the traditional angular modes, LM models or the disclosed neural network mode; by minimising a rate-distortion cost criterion.

The above arrangement can be implemented in a video communication network, designed to process a video presentation by encoding techniques, enabling it to be transmitted (or stored) for decoding by a playback device.

In general terms, an aspect of the present disclosure enables intra-prediction of chroma samples based on luma samples and an attention mask, the attention mask being configured through convolutional neural network.

Figure 1:
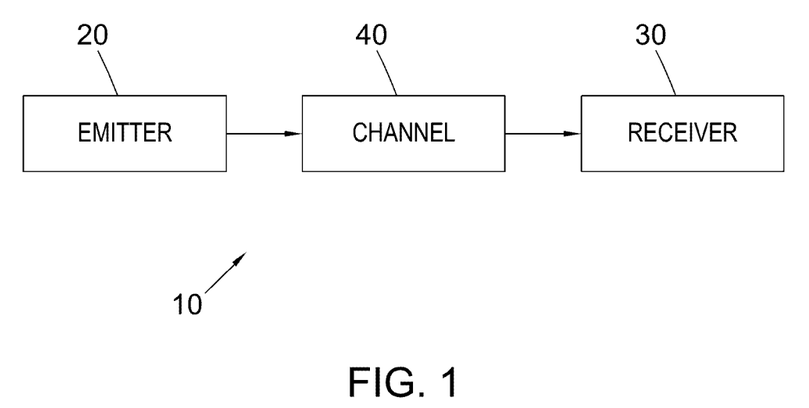
FIG. 1 is a schematic representation of a communications network in accordance with an embodiment.

As illustrated in FIG. 1, an arrangement is illustrated comprising a schematic video communication network 10, in which an emitter 20 and a receiver 30 are in communication via a communications channel 40. In practice, the communications channel 40 may comprise a satellite communications channel, a cable network, a ground-based radio broadcast network, a POTS-implemented communications channel, such as used for provision of internet services to domestic and small business premises, fibre optic communications systems, or a combination of any of the above and any other conceivable communications medium.

Furthermore, the disclosure also extends to communication, by physical transfer, of a storage medium on which is stored a machine readable record of an encoded bitstream, for passage to a suitably configured receiver capable of reading the medium and obtaining the bitstream therefrom. An example of this is the provision of a digital versatile disk (DVD) or equivalent. The following description focuses on signal transmission, such as by electronic or electromagnetic signal carrier, but should not be read as excluding the aforementioned approach involving storage media.

Figure 2:
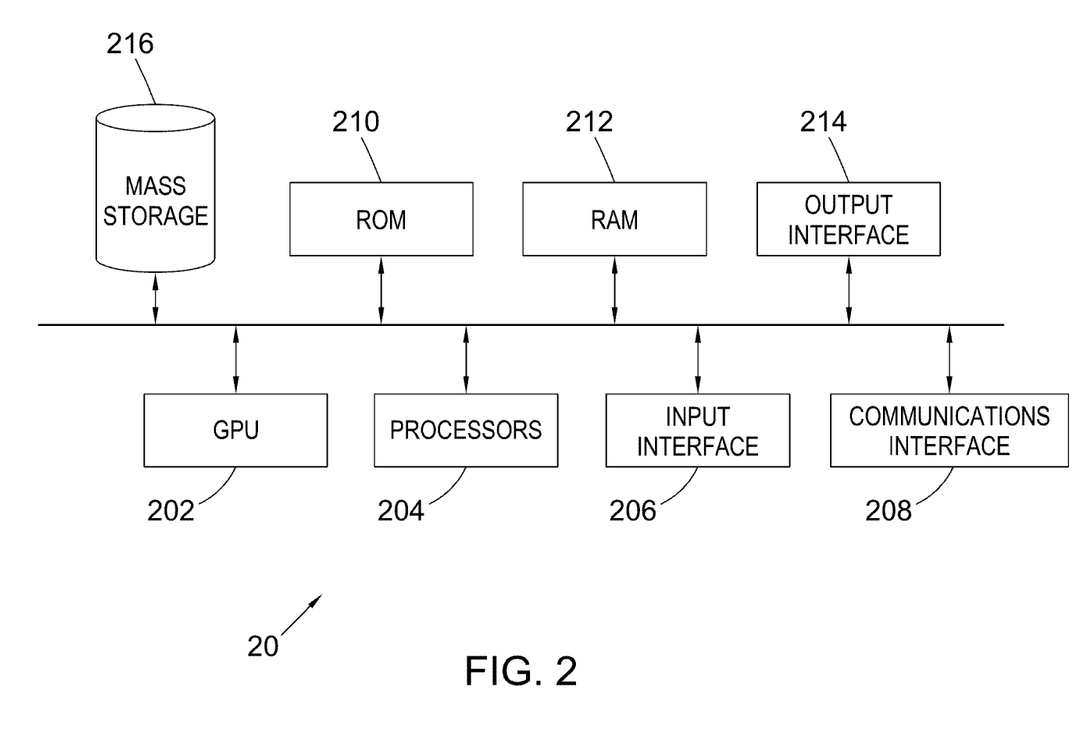
FIG. 2 is a schematic representation of an emitter of the communications network of FIG. 1.

As shown in FIG. 2, the emitter 20 is a computer apparatus, in structure and function. It may share, with general purpose computer apparatus, certain features, but some features may be implementation specific, given the specialised function for which the emitter 20 is to be put. The reader will understand which features can be of general purpose type, and which may be required to be configured specifically for use in a video emitter.

The emitter 20 thus comprises a graphics processing unit (GPU) 202 configured for specific use in processing graphics and similar operations. The emitter 20 also comprises one or more other processors 204, either generally provisioned, or configured for other purposes such as mathematical operations, audio processing, managing a communications channel, and so on.

An input interface 206 provides a facility for receipt of user input actions. Such user input actions could, for instance, be caused by user interaction with a specific input unit including one or more control buttons and/or switches, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 214 is operable to provide a facility for output of signals to a user or another device. Such output could include a display signal for driving a local video display unit (VDU) or any other device.

A communications interface 208 implements a communications channel, whether broadcast or end-to-end, with one or more recipients of signals. In the context of the present embodiment, the communications interface is configured to cause emission of a signal bearing a bitstream defining a video signal, encoded by the emitter 20.

The processors 204, and specifically for the benefit of the present disclosure, the GPU 202, are operable to execute computer programs, in operation of the encoder. In doing this, recourse is made to data storage facilities provided by a mass storage device 208 which is implemented to provide large-scale data storage albeit on a relatively slow access basis, and will store, in practice, computer programs and, in the current context, video presentation data, in preparation for execution of an encoding process.

A Read Only Memory (ROM) 210 is preconfigured with executable programs designed to provide the core of the functionality of the emitter 20, and a Random Access Memory 212 is provided for rapid access and storage of data and program instructions in the pursuit of execution of a computer program.

Figure 3:
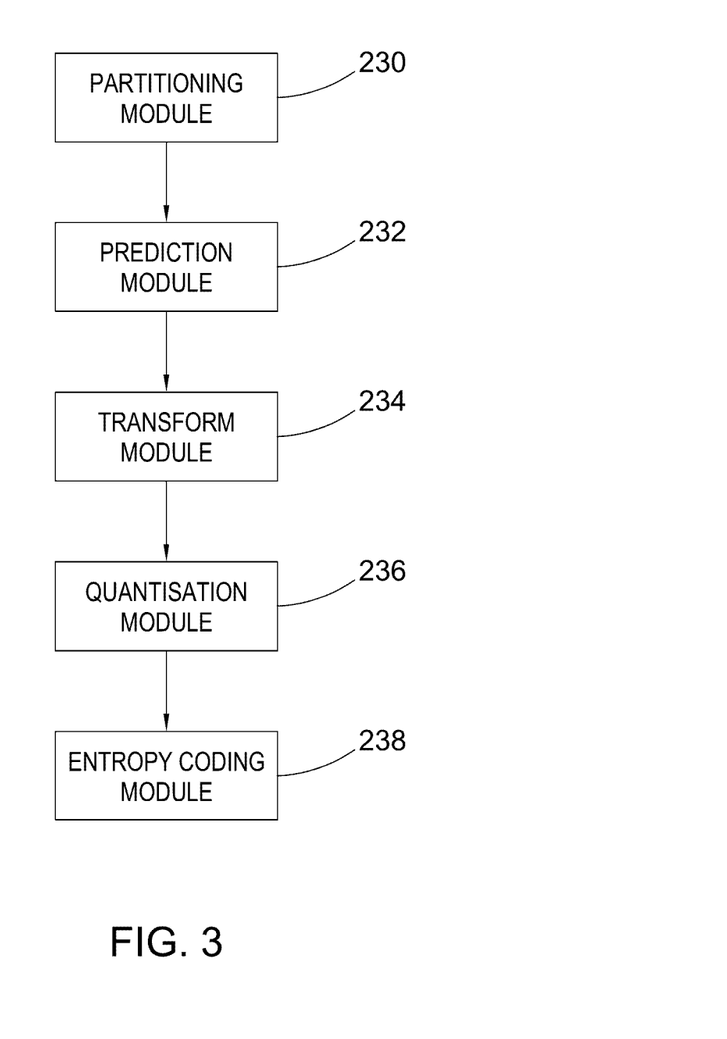
FIG. 3 is a diagram illustrating an encoder implemented on the emitter of FIG. 2.

The function of the emitter 20 will now be described, with reference to FIG. 3. FIG. 3 shows a processing pipeline performed by an encoder implemented on the emitter 20 by means of executable instructions, on a data file representing a video presentation comprising a plurality of frames for sequential display as a sequence of pictures.

The data file may also comprise audio playback information, to accompany the video presentation, and further supplementary information such as electronic programme guide information, subtitling, or metadata to enable cataloguing of the presentation. The processing of these aspects of the data file are not relevant to the present disclosure.

Referring to FIG. 3, the current picture or frame in a sequence of pictures is passed to a partitioning module 230 where it is partitioned into rectangular blocks of a given size for processing by the encoder. This processing may be sequential or parallel. The approach may depend on the processing capabilities of the specific implementation.

Each block is then input to a prediction module 232, which seeks to discard temporal and spatial redundancies present in the sequence and obtain a prediction signal using previously coded content. Information enabling computation of such a prediction is encoded in the bitstream. This information should comprise sufficient information to enable computation, including the possibility of inference at the receiver of other information necessary to complete the prediction. Further detail of the prediction module of the presently disclosed embodiment will be provided below.

The prediction signal is subtracted from the original signal to obtain a residual signal. This is then input to a transform module 234, which attempts to further reduce spatial redundancies within a block by using a more suitable representation of the data. As noted above, in this embodiment, it is contemplated that domain transformation may not be implemented on every set of residuals and, instead, depending on the likely efficiency of doing so, transform skip may instead be implemented. Employment of transform skip, may be signalled in the bitstream.

The resulting signal is then typically quantised by quantisation module 236, and finally the resulting data formed of the coefficients and the information necessary to compute the prediction for the current block is input to an entropy coding module 238 makes use of statistical redundancy to represent the signal in a compact form by means of short binary codes. The reader will note that, if transform skip has been employed, transform skip residual coding (TSRC) is employed.

By repeated action of the encoding facility of the emitter 20, a bitstream of block information elements can be constructed for transmission to a receiver or a plurality of receivers, as the case may be. The bitstream may also bear information elements which apply across a plurality of block information elements and are thus held in bitstream syntax independent of block information elements. Examples of such information elements include configuration options, parameters applicable to a sequence of frames, and parameters relating to the video presentation as a whole.

The prediction module 232 will now be described in further detail, with reference to FIG. 4. As will be understood, this is but an example, and other approaches, within the scope of the present disclosure and the appended claims, could be contemplated.

The following process is performed on each block in a frame.

The prediction module 232 is configured to process input luma samples and chroma samples, to produce prediction data which can then be used to generate residuals for further processing as described above.

The structure and function of the prediction module 232 will now be described with reference to FIG. 4.

In general terms, the prediction module 232 comprises a neural network architecture which incorporates an attention module 250 for controlling the contribution of each reference neighbouring sample when computing the prediction for each sample location, ensuring that spatial information is considered when computing the prediction. The prediction module 232 has three network branches that are combined to produce prediction samples. As illustrated, first and second branches are implemented in parallel to extract features from the available samples, including the luma block as well as the neighbouring luma and chroma reference samples. The first branch (referred to as cross-component boundary branch) aims at extracting cross-component information from neighbouring reconstructed samples, using an extended reference array on the left of and above the current block. The second branch (referred to as luma convolutional branch) extracts spatial patterns over the collocated luma block applying convolutional operations. The attention module fuses the features output by the first and second branches.

The output of the attention module 250 is finally fed into a third network branch, to produce the resulting Cb and Cr chroma output predictions.

"Attention-based" learning, as used in deep learning frameworks, is employed to improve the performance of trained networks in complex prediction tasks. Attention models can reduce complex tasks by predicting smaller "areas of attention" that are processed sequentially in order to encourage more efficient learning. In particular, self-attention (or intra-attention) is used to assess the impact of particular input variables on the outputs, whereby the prediction is computed focusing on the most relevant elements of the same sequence. The attention module 250 of the described embodiment seeks to combine the features from the first and second network branches in order to assess the impact of each input variable with respect to their spatial locations.

This approach can resolve an important limitation of similar techniques to compute ML-based intra-predicted samples, that generally completely discard the information contained in the spatial location of the input and output samples.

In an example of use of the embodiment, it is assumed that intra-prediction has already been performed on the luma component and that the final reconstructed luma samples are available. Depending on the chroma sub-sampling being used, this block is then downsampled using the conventional filters available in VVC, to obtain a block of collocated luma samples of the same N×N spatial dimensions as the corresponding chroma components. For simplicity, only square blocks are considered in this version of the algorithm. More block sizes as well as advanced downsampling filters could be used without loss of generality.

The collocated luma block is denoted $X \in \mathcal{R}^{N \times N}$. The array of reference samples on the top-left of the current block is denoted $B_c \in \mathcal{R}^{2N+1}$, b=2N+1, where c=Y, Cb, Cr for the three components, respectively, where B is constructed as follows.

First, samples in the left boundary are considered starting from the bottom-most sample; then the corner is considered; then, the samples on top are considered starting from the left-most sample. In case some reference samples are not available, these are padded using a predefined value.

Finally, the cross-component volume obtained by concatenating the three reference arrays $B_Y$, $B_{Cb}$, $B_{Cr}$ is denoted $S \in \mathcal{R}^{3 \times b}$. After applying the cross-component boundary branch over S and the luma convolutional branch over X, transformed feature volumes $\tilde{X} \in \mathcal{R}^{N \times N \times D = N^2 \times C}$ and $\tilde{S} \in \mathcal{R}^{b \times D}$ are obtained respectively.

Figure 4:
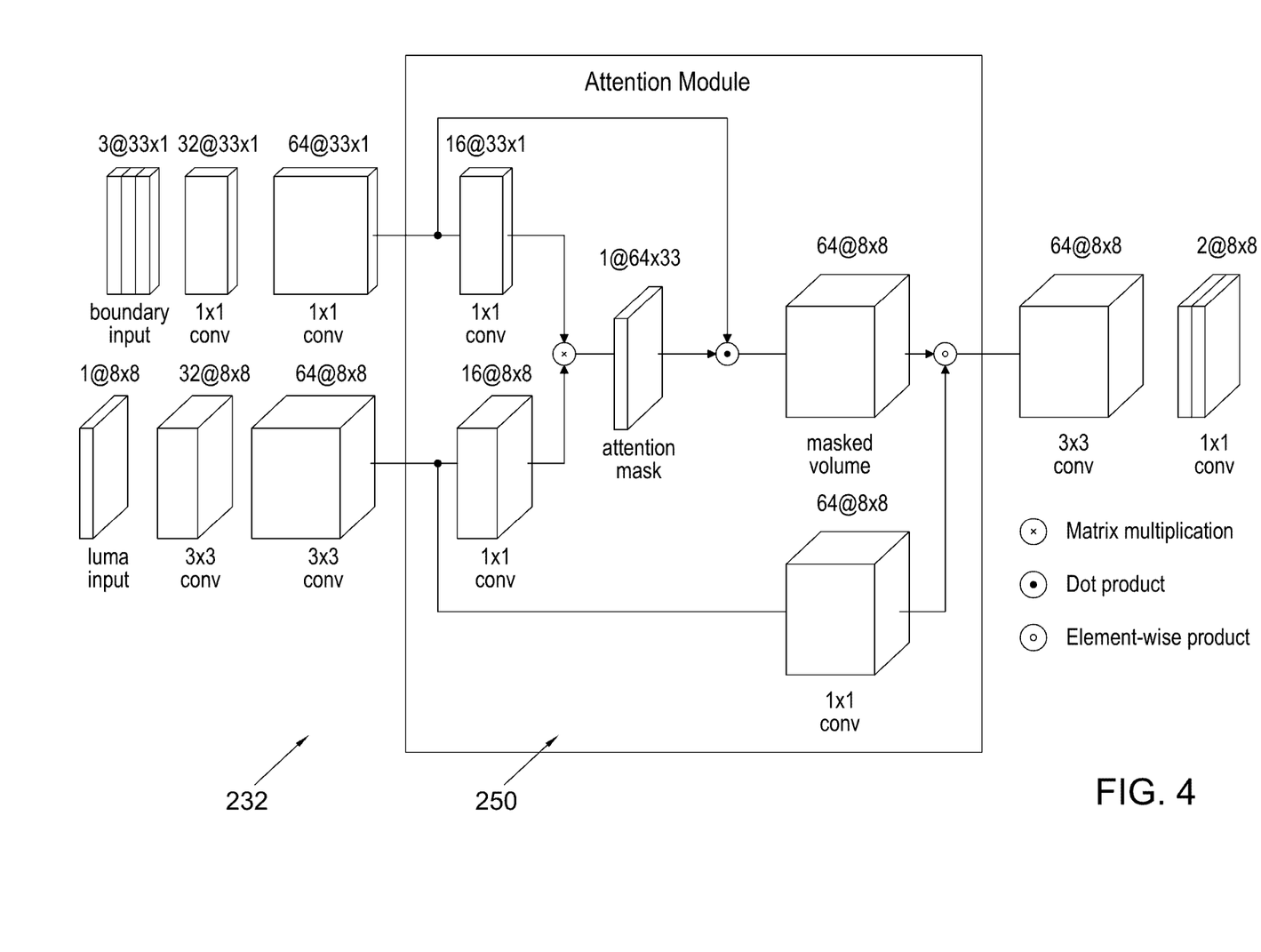
FIG. 4 is a process diagram showing structure and function of a prediction module of the encoder of FIG. 3.

FIG. 4 illustrates the sub-network architecture for both branches (for a particular case of an 8×8 block). Table 1 provides disclosure of the chosen network hyperparameters for other block sizes. Extended details about the construction and implementation of both branches are not provided due to using a similar structure than the aforementioned state-of-the-art hybrid NN-based method.

Table 1—Network hyperparameters per block size. Particularly, the depth of the convolutional kernels applied on the different branches of the proposed architecture.

|  | Branch | | |
| --- | --- | --- | --- |
|  | 4 × 4 | 8 × 8 | 16 × 16 |
| Cross-component boundary branch | 16, 32 | 32, 64 | 64, 96 |
| Luma convolutional branch | 32, 32 | 64, 64 | 96, 96 |
| Attention module | 16, 16, 32 | 16, 16, 64 | 16, 16, 96 |
| Output branch | 32, 2 | 64, 2 | 96, 2 |

Already within the proposed attention-based fusion module, each of these two feature maps is convoluted using a 1×1 kernel, to project them into two corresponding reduced feature spaces. Specifically, $\tilde{S}$ is convoluted with a filter $W_F \in \mathcal{R}^{h \times D}$ to obtain the h-dimensional feature matrix F. Similarly, $\tilde{X}$ is convoluted with a filter $W_G \in \mathcal{R}^{h \times C}$ to obtain the h-dimensional feature matrix G. The two matrices are multiplied together to obtain the pre-attention map $M=G^T F$. Finally, the attention matrix $A \in \mathcal{R}^{N^2 \times b}$ is obtained applying a softmax operation to each element of M, to generate the probability of each boundary location in being able to predict each sample location in the block. Formally, for each element $\alpha_{i,j}$ in A, where $j=0 \ldots N^2-1$ represents the sample location in the predicted block and $j=0 \ldots b-1$ $ represents a reference sample location, the following is applied:

$$\alpha_{i,j} = \frac{e^{\frac{m_{i,j}}{T}}}{\sum_{i=0}^{N^2-1} e^{\frac{m_{i,j}}{T}}}$$

where T is the softmax temperature parameter controlling the smoothness of the generated probabilities, with $0 \leq T \leq 1$. Notice that the smaller the value of T, the more localised are the obtained attention areas, resulting in correspondingly less boundary samples contributing to a given prediction location.

The weighted sum of the contribution of each reference sample in predicting a given output location is obtained by computing the dot product between the cross-component boundary features $\tilde{S}$ and the attention matrix A, or formally $<\tilde{S},A>$, where $<\cdot>$ is the dot product. In order to further refine $<\tilde{S},A>$, this weighted sum can be multiplied by the output of the luma branch. To do so, the output of the luma branch must be transformed to change its dimensions by means of a 1×1 convolution using a matrix $W_{\tilde{X}} \in \mathcal{R}^{D \times C}$, to obtain a transformed representation $\tilde{X} \in \mathcal{R}^{N^2 \times D}$. This operation is applied to ensure that the dimensions of the output of the luma convolutional branch are compatible with $<\tilde{S},A>$. Finally, the output of the attention model $O \in \mathcal{R}^{N^2 \times D}$ is obtained as follows: $\tilde{X}^\circ <\tilde{S},A>$, where $^\circ$ is the element-wise product.

As an example, the dimension parameter h within the attention module is set to 16 for all the trained models, being the optimal trade-off between performance and complexity. A value of T=0.5 is cross-validated, ensuring an optimal balance between informative samples and noisy ones from the rest of boundary locations.

In addition, it will be noted that the prediction module 232 may be configured to employ one of a plurality of predetermined inter-prediction modes, but inter-prediction is not relevant to the scope of this disclosure. Further, the above disclosure does not exclude the possibility of implementation of existing intra-prediction modes specified for example under VVC.

Figure 5:
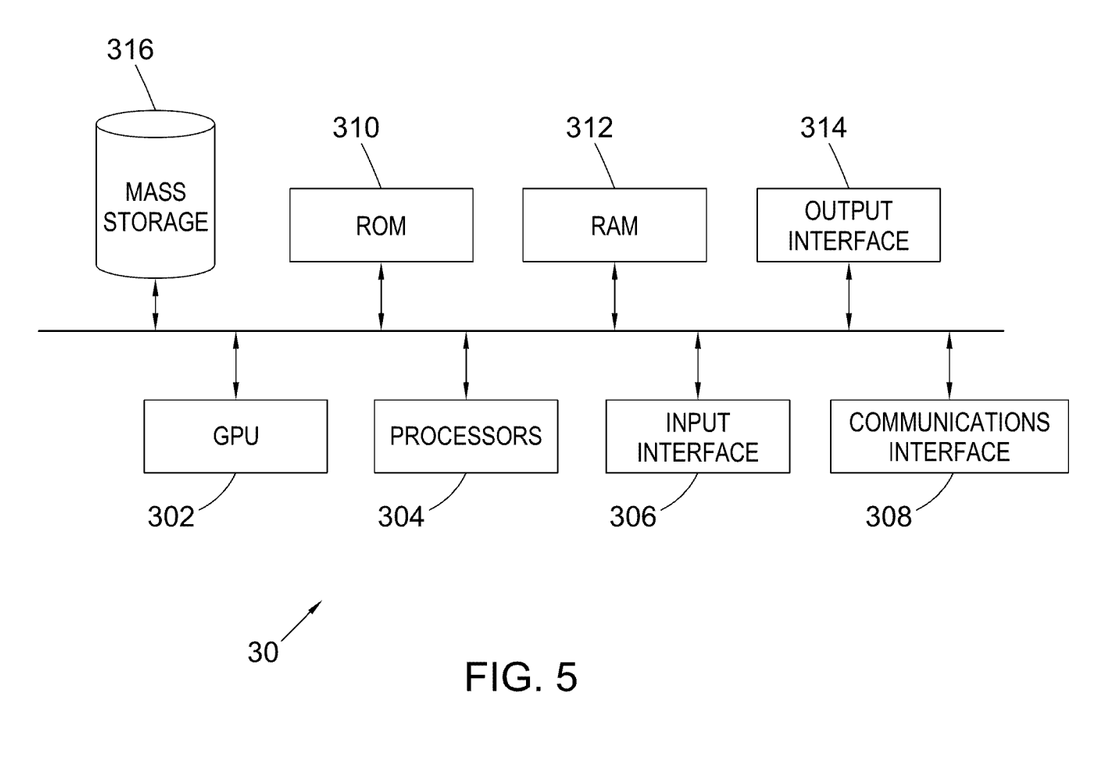
FIG. 5 is a schematic representation of a receiver of the communications network of FIG. 1.

The structural architecture of the receiver is illustrated in FIG. 5. It has the elements of being a computer implemented apparatus. The receiver 30 thus comprises a graphics processing unit 302 configured for specific use in processing graphics and similar operations. The receiver 30 also comprises one or more other processors 304, either generally provisioned, or configured for other purposes such as mathematical operations, audio processing, managing a communications channel, and so on.

As the reader will recognise, the receiver 30 may be implemented in the form of a set-top box, a hand held personal electronic device, a personal computer, or any other device suitable for the playback of video presentations.

An input interface 306 provides a facility for receipt of user input actions. Such user input actions could, for instance, be caused by user interaction with a specific input unit including one or more control buttons and/or switches, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 314 is operable to provide a facility for output of signals to a user or another device. Such output could include a television signal, in suitable format, for driving a local television device.

A communications interface 308 implements a communications channel, whether broadcast or end-to-end, with one or more recipients of signals. In the context of the present embodiment, the communications interface is configured to cause emission of a signal bearing a bitstream defining a video signal, encoded by the receiver 30.

The processors 304, and specifically for the benefit of the present disclosure, the GPU 302, are operable to execute computer programs, in operation of the receiver. In doing this, recourse is made to data storage facilities provided by a mass storage device 308 which is implemented to provide large-scale data storage albeit on a relatively slow access basis, and will store, in practice, computer programs and, in the current context, video presentation data, resulting from execution of an receiving process.

A Read Only Memory (ROM) 310 is preconfigured with executable programs designed to provide the core of the functionality of the receiver 30, and a Random Access Memory 312 is provided for rapid access and storage of data and program instructions in the pursuit of execution of a computer program.

Figure 6:
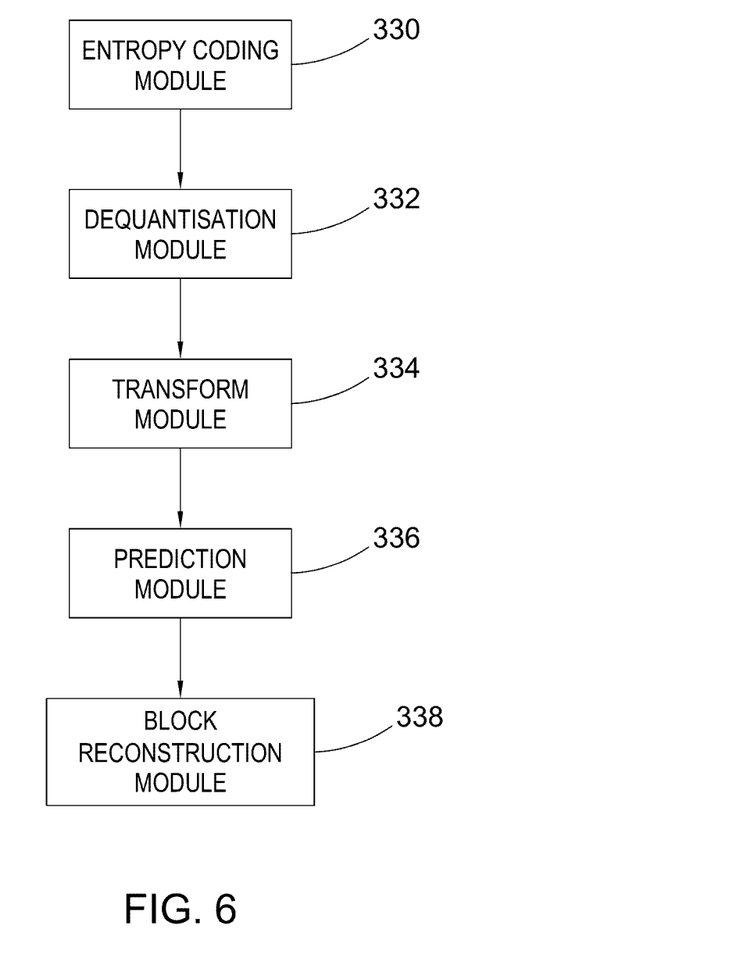
FIG. 6 is a diagram illustrating a decoder implemented on the receiver of FIG. 4.

The function of the receiver 30 will now be described, with reference to FIG. 6. FIG. 6 shows a processing pipeline performed by a decoder implemented on the receiver 20 by means of executable instructions, on a bitstream received at the receiver 30 comprising structured information from which a video presentation can be derived, comprising a reconstruction of the frames encoded by the encoder functionality of the emitter 20.

The decoding process illustrated in FIG. 6 aims to reverse the process performed at the encoder. The reader will appreciate that this does not imply that the decoding process is an exact inverse of the encoding process.

A received bit stream comprises a succession of encoded information elements, each element being related to a block. A block information element is decoded in an entropy decoding module 330 to obtain a block of coefficients and the information necessary to compute the prediction for the current block. The block of coefficients is typically dequantised in dequantisation module 332 and typically inverse transformed to the spatial domain by transform module 334, unless transform skip is signalled to the decoder.

As noted above, the reader will recognise that entropy decoding, dequantisation and inverse transformation would only need to be employed at the receiver if entropy encoding, quantisation and transformation, respectively, had been employed at the emitter.

A prediction signal is generated as before, from previously decoded samples from current or previous frames and using the information decoded from the bit stream, by prediction module 336. A reconstruction of the original picture block is then derived from the decoded residual signal and the calculated prediction block in the reconstruction block 338. In embodiments, the prediction module 336 will be configured to be responsive to information, on the bitstream, signalling the use of intra-prediction and, if such information is present, reading from the bitstream information which enables the decoder to determine which intra-prediction mode has been employed and thus which prediction technique should be employed in reconstruction of a block information sample.

By repeated action of the decoding functionality on successively received block information elements, picture blocks can be reconstructed into frames which can then be assembled to produce a video presentation for playback.

An exemplary decoder algorithm, complementing the encoder algorithm described earlier, is illustrated in FIG. 7. This algorithm relates to the use of the neural network implemented chroma prediction mode—if the implementation allows other chroma prediction modes to be implemented also, such as the modes currently defined in VVC, then this can be signalled to the decoder also.

As noted previously, the decoder functionality of the receiver 30 extracts from the bitstream a succession of block information elements, as encoded by the encoder facility of the emitter 20, defining block information and accompanying configuration information.

Figure 7:
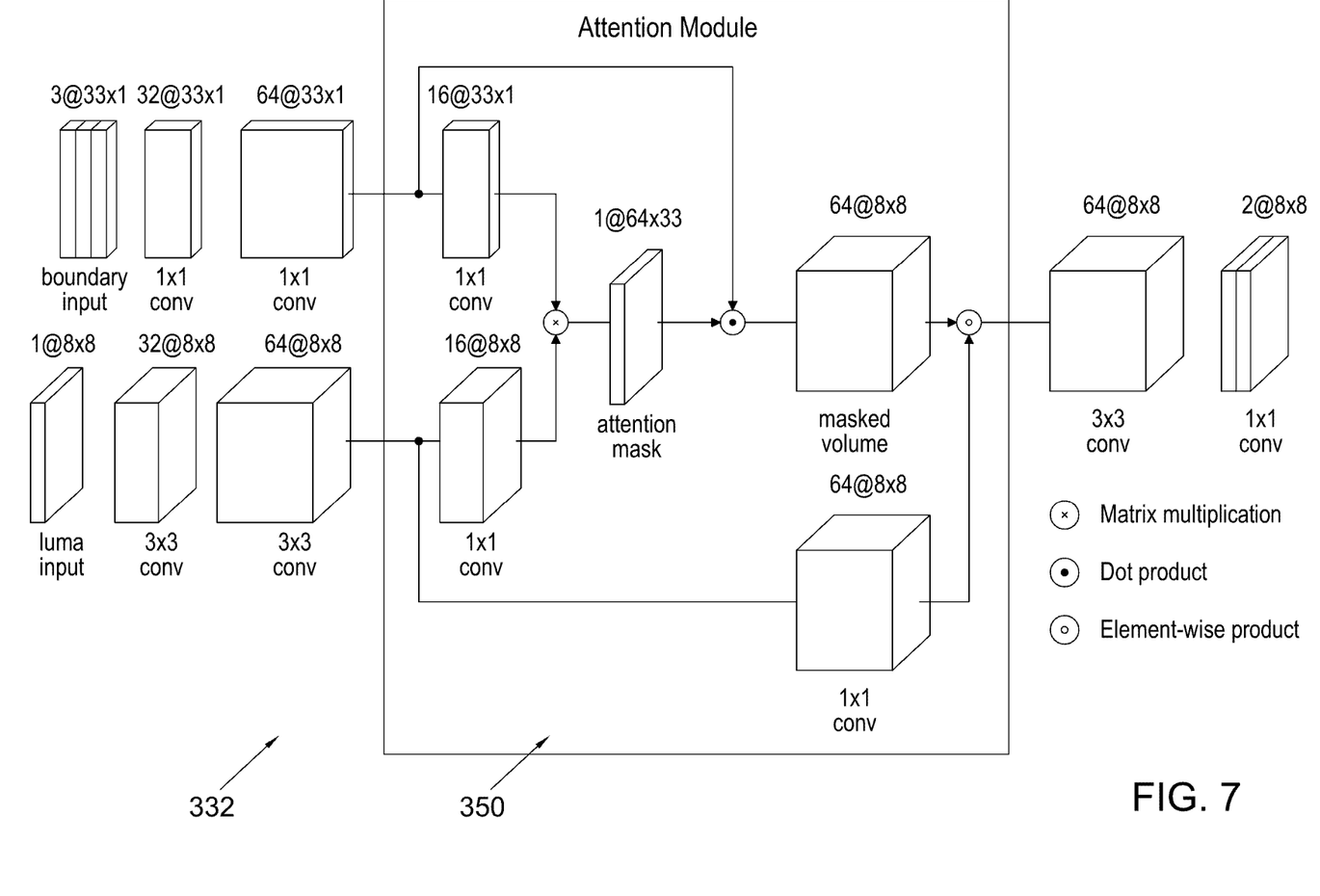
FIG. 7 is a process diagram showing structure and function of a prediction module of the decoder of FIG. 6.

The following process is performed on each encoded block in a frame to be decoded. The prediction module 332 is configured to process input encoded luma data and encoded chroma data, to produce reconstructed luma and chroma sample data which can then be used for further processing as described above.

The structure and function of the prediction module 332 will now be described with reference to FIG. 7.

In general terms, the prediction module 332 comprises a neural network architecture which incorporates an attention module 350 for controlling the contribution of each reference neighbouring sample when computing the prediction for each sample location, ensuring that spatial information is considered when computing the prediction. The prediction module 332 has three network branches that are combined to produce prediction samples. As illustrated, first and second branches are implemented in parallel to extract features from the available reconstructed samples, including the already reconstructed luma block as well as the neighbouring luma and chroma reference samples. The first branch (referred to as cross-component boundary branch) aims at extracting cross-component information from neighbouring reconstructed samples, using an extended reference array on the left of and above the current block. The second branch (referred to as luma convolutional branch) extracts spatial patterns over the collocated luma block applying convolutional operations. The attention module fuses the features output by the first and second branches.

The output of the attention module 350 is finally fed into a third network branch, to produce the resulting Cb and Cr chroma output predictions.

The same approach to performance of the attention module is used at the decoder as the encoder. It will be expected that the attention module at the decoder has been trained in the same manner as that at the encoder, to replicate intra-prediction decisions taken at the encoder. This ensures the reconstruction of chroma data at the decoder.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of decoding video data, the method comprising:
    extracting reference samples from reconstructed luma samples and reconstructed chroma samples; and
    constructing at least one block of chroma prediction samples from the reference samples, wherein the constructing of chroma prediction samples depends on the spatial location of the reference samples, and wherein the constructing of chroma prediction samples depends on the usage of an attention module, where the attention module is configured as a deep neural network, wherein the attention module is configured to calculate an attention matrix comprising weights representing a contribution to the prediction of a given output location, each weight corresponding to a reference sample of the extracted reference samples.

2. A method in accordance with claim 1, wherein the reference samples include reconstructed chroma samples from neighbouring blocks of the block of chroma prediction samples.

3. A method in accordance with claim 1, wherein the reference samples include reconstructed luma samples collocated with the block of chroma prediction samples.

4. A method in accordance with claim 1, wherein the reference samples include reconstructed luma samples from the neighbouring blocks of the block of collocated reconstructed luma samples.

5. A method in accordance with claim 1, wherein the constructing of chroma prediction samples depends on the computation of cross-component information.

6. A method in accordance with claim 1, wherein the constructing of chroma prediction samples depends on extracting spatial pattern data over a block of luma data using at least one convolutional operation.

7. A method in accordance with claim 1, comprising controlling, with the attention module, the contribution of each reference neighbouring sample to the computation of the prediction for a sample location.

8. A method in accordance with claim 1, further implementing one or more other modes of constructing at least one block of chroma data, and wherein the mode of constructing at least one block of chroma data is determined on the basis of a received signal.

9. A decoder for decoding video data, comprising:
    a reference sample extractor for extracting reference samples from reconstructed luma samples and reconstructed chroma samples; and
    a chroma prediction samples constructor for constructing at least one block of chroma prediction samples from the reference samples, wherein the chroma prediction samples constructor is operable to construct chroma prediction samples depending on the spatial location of the reference samples, wherein the chroma prediction samples constructor is operable to construct chroma prediction samples depending on the usage of an attention module, wherein the attention module is configured as a deep neural network, wherein the attention module is configured to calculate an attention matrix comprising weights representing a contribution to the prediction of a given output location, each weight corresponding to a reference sample of the extracted reference samples.

10. A decoder in accordance with claim 9, wherein the reference samples include reconstructed chroma samples from neighbouring blocks of the block of chroma prediction samples.

11. A decoder in accordance with claim 9, wherein the reference samples include reconstructed luma samples collocated with the block of chroma prediction samples.

12. A decoder in accordance with claim 9, wherein the reference samples include reconstructed luma samples from the neighbouring blocks of the block of collocated reconstructed luma samples.

13. A decoder in accordance with claim 9, wherein the constructing of chroma prediction samples depends on the computation of cross-component information.

14. A decoder in accordance with claim 9, wherein the constructing of chroma prediction samples depends on extracting spatial pattern data over a block of luma data using at least one convolutional operation.

15. A decoder in accordance with claim 9, wherein the attention module is operable to control the contribution of each reference neighbouring sample to the computation of the prediction for a sample location.

16. A decoder in accordance with claim 9, wherein the chroma prediction samples constructor is operable in one or more other modes of constructing at least one block of chroma data, and wherein the mode of constructing at least one block of chroma data is determined on the basis of a received signal.

\* \* \* \* \*